(12) United States Patent
Lee

(10) Patent No.: US 11,914,257 B2
(45) Date of Patent: Feb. 27, 2024

(54) DISPLAY DEVICE AND MANUFACTURING METHOD THEREOF

(71) Applicant: Samsung Display Co., Ltd., Yongin-si (KR)

(72) Inventor: Jung-Woo Lee, Gwangmyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/903,522

(22) Filed: Sep. 6, 2022

(65) Prior Publication Data

US 2023/0135797 A1 May 4, 2023

(30) Foreign Application Priority Data

Nov. 1, 2021 (KR) ........................ 10-2021-0148154

(51) Int. Cl.
| | | |
|---|---|---|
| *G02F 1/1368* | (2006.01) | |
| *G02F 1/13* | (2006.01) | |
| *G02F 1/1333* | (2006.01) | |
| *G02F 1/1343* | (2006.01) | |

(52) U.S. Cl.
CPC .......... *G02F 1/1368* (2013.01); *G02F 1/1303* (2013.01); *G02F 1/1333* (2013.01); *G02F 1/13439* (2013.01)

(58) Field of Classification Search
None
See application file for complete search history.

(56) References Cited

U.S. PATENT DOCUMENTS

| | | | | |
|---|---|---|---|---|
| 7,442,627 B2* | 10/2008 | Tsuji | ................. | C23C 16/45595 |
| | | | | 438/57 |
| 7,776,668 B2* | 8/2010 | Yoo | ..................... | H01L 27/1214 |
| | | | | 257/E21.414 |
| 10,303,284 B2 | 5/2019 | Fujino et al. | | |
| 2005/0003231 A1* | 1/2005 | Suzuki | ................... | H10K 50/81 |
| | | | | 428/917 |
| 2006/0046339 A1* | 3/2006 | Seo | ....................... | H10K 71/233 |
| | | | | 438/149 |
| 2007/0298538 A1* | 12/2007 | Tanabe | .................. | G02F 1/1368 |
| | | | | 438/107 |
| 2013/0194525 A1* | 8/2013 | Lee | .................... | G02F 1/133711 |
| | | | | 349/123 |
| 2017/0038889 A1* | 2/2017 | Fujino | ................. | C23C 14/5806 |

FOREIGN PATENT DOCUMENTS

| | | |
|---|---|---|
| KR | 1020030045607 A | 6/2003 |
| KR | 100663624 B1 | 1/2007 |
| KR | 1020160038624 A | 4/2016 |
| KR | 1020160148503 A | 12/2016 |

* cited by examiner

*Primary Examiner* — Ryan Crockett
(74) *Attorney, Agent, or Firm* — CANTOR COLBURN LLP

(57) ABSTRACT

A display device includes: a base substrate, a transistor disposed on the base substrate, an organic layer disposed on the transistor, a display element layer disposed on the organic layer, and a pixel electrode disposed between the organic layer and the display element layer. The pixel electrode includes a first electrode layer disposed between the organic layer and the display element layer and containing an organic matter derived from the organic layer, and a second electrode layer disposed between the first electrode and the display element layer and not containing the organic matter.

11 Claims, 13 Drawing Sheets

DISPLAY DEVICE AND MANUFACTURING METHOD THEREOF

This application claims priority to Korean Patent Application No. 10-2021-0148154, filed on Nov. 1, 2021, and all the benefits accruing therefrom under 35 U.S.C. § 119, the contents of which in their entirety are herein incorporated by reference.

BACKGROUND

The present disclosure herein relates to a display device including a pixel electrode in which a plurality of layers are stacked.

In general, a display device includes a substrate and a plurality of pixels provided on the substrate. Each of the pixels includes a transistor connected to a gate line and a data line that are provided on the substrate. To the transistor, a gate-on voltage is input through the gate line and an image signal is input through the data line.

A pixel electrode is disposed between the transistor and the substrate. The pixel electrode serves to electrically connect a thin film transistor and a circuit layer included in the substrate. Studies for developing a pixel electrode having high electrical conductivity and high physical strength have been performed.

SUMMARY

The present disclosure provides a display device including a pixel electrode having excellent physical strength, and a manufacturing method of the display device.

An embodiment of the invention provides a display device including: a base substrate, a transistor disposed on the base substrate, an organic layer disposed on the transistor, a display element layer disposed on the organic layer, and a pixel electrode disposed between the organic layer and the display element layer. The pixel electrode includes a first electrode layer disposed between the organic layer and the display element layer and containing an organic matter derived from the organic layer, and a second electrode layer disposed between the first electrode and the display element layer and not containing the organic matter.

In an embodiment, a thickness of the first electrode layer may be smaller than a thickness of the second electrode layer.

In an embodiment, the first electrode layer may have a thickness of about 50 micrometers ($\mu m$) to about 100 $\mu m$.

In an embodiment, the first electrode layer and the second electrode layer may include the same metal oxide.

In an embodiment, the first electrode layer and the second electrode layer may each independently include at least one of an indium zinc oxide ("IZO") or an indium titanium oxide ("ITO").

In an embodiment, the organic matter may include a carbon trioxide.

In an embodiment, the organic matter may further include carbon.

In an embodiment, the first electrode layer may be disposed directly on the organic layer.

In an embodiment, the second electrode layer may be disposed directly on the first electrode layer.

In an embodiment, the first electrode layer and the second electrode layer may each be formed via a sputtering method.

In an embodiment, the pixel electrode may further include a third electrode layer disposed on the second electrode layer and not containing the organic matter.

In an embodiment, the second electrode layer and the third electrode layer may include the same material.

In an embodiment of the invention, a display device manufacturing method using a display device manufacturing apparatus including a front-stage chamber and a rear-stage chamber, includes: providing the front-stage chamber with a preliminary display substrate including a base substrate, a transistor disposed on the base substrate, and an organic layer disposed on the transistor; forming a first electrode layer on the organic layer in the front-stage chamber; changing the inside of the front-stage chamber into a vacuum state after the forming of the first electrode layer; and forming a second electrode layer on the first electrode layer after the changing of the inside of the front-stage chamber into a vacuum state. The first electrode layer contains an organic matter derived from the organic layer, and the second electrode layer does not contain the organic matter.

In an embodiment, the forming of the first electrode layer and the forming of the second electrode layer may each include depositing a metal oxide. A first time taken to deposit the metal oxide in the forming of the first electrode layer may be shorter than a second time taken to deposit the metal oxide in the forming of the second electrode layer.

In an embodiment, the ratio of the first time and the second time may be about 1:1.75 to about 1:4.50.

In an embodiment, the forming of the first electrode layer may include introducing the organic matter, which is discharged from the organic layer into the first electrode layer.

In an embodiment, the organic matter may include a carbon trioxide.

In an embodiment, the organic matter may further include carbon.

In an embodiment, the changing of the inside of the front-stage chamber into the vacuum state may include removing the organic matter from the inside of the front-stage chamber.

In an embodiment, the display device manufacturing method may further include providing the rear-stage chamber with the preliminary display substrate on which the first electrode layer and the second electrode layer are deposited, and forming, in the rear-stage chamber, a third electrode layer not containing the organic matter, on the second electrode layer.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
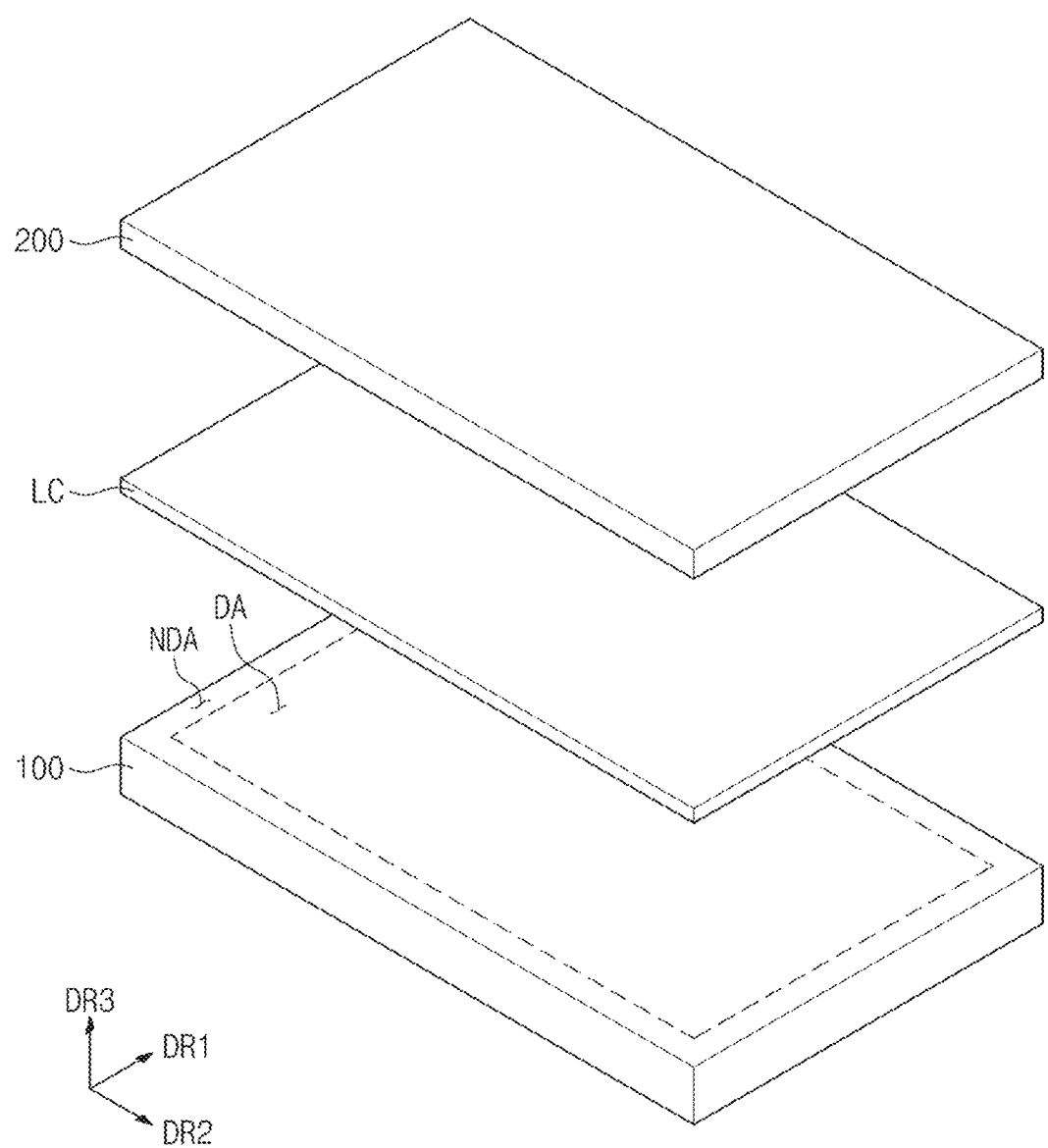
FIG. 1 is an exploded perspective view of a display device according to an embodiment.

Embodiments of the invention will be described below in more detail with reference to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art.

It will be understood that when an element (or region, layer, section, etc.) is referred to as being "on", "connected to" or "coupled to" another element, it can be disposed directly on, connected or coupled to the other element or a third intervening element may be disposed between the elements.

It will be understood that when an element such as a layer, film, region, or substrate is referred to as being "disposed directly", there is no intervening element, such as a layer, film, region, or substrate, present. For example, it will be understood that when an element is referred to as being "disposed directly", two layers or two members can be disposed without any additional member, such as an adhesive member, therebetween.

Like reference numbers or symbols refer to like elements throughout. In addition, in the drawings, the thickness, the ratio, and the dimension of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "At least one of A, B or C" means only A, only B, only C, or any combination of A, B and C. "Or" means "and/or." The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concept and are explained based on the direction shown in the drawing. In the present disclosure, the wording "disposed above" may means being disposed on not only an upper portion of one member but also a lower portion.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms such as "includes" or "has", when used herein, specify the presence of stated features, numerals, steps, operations, elements, parts, or the combination thereof, but do not preclude the presence or addition of one or more other features, numerals, steps, operations, elements, parts, or the combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, a display device according to an embodiment of the invention will be described with reference to the accompanying drawings.

Figure 2A:
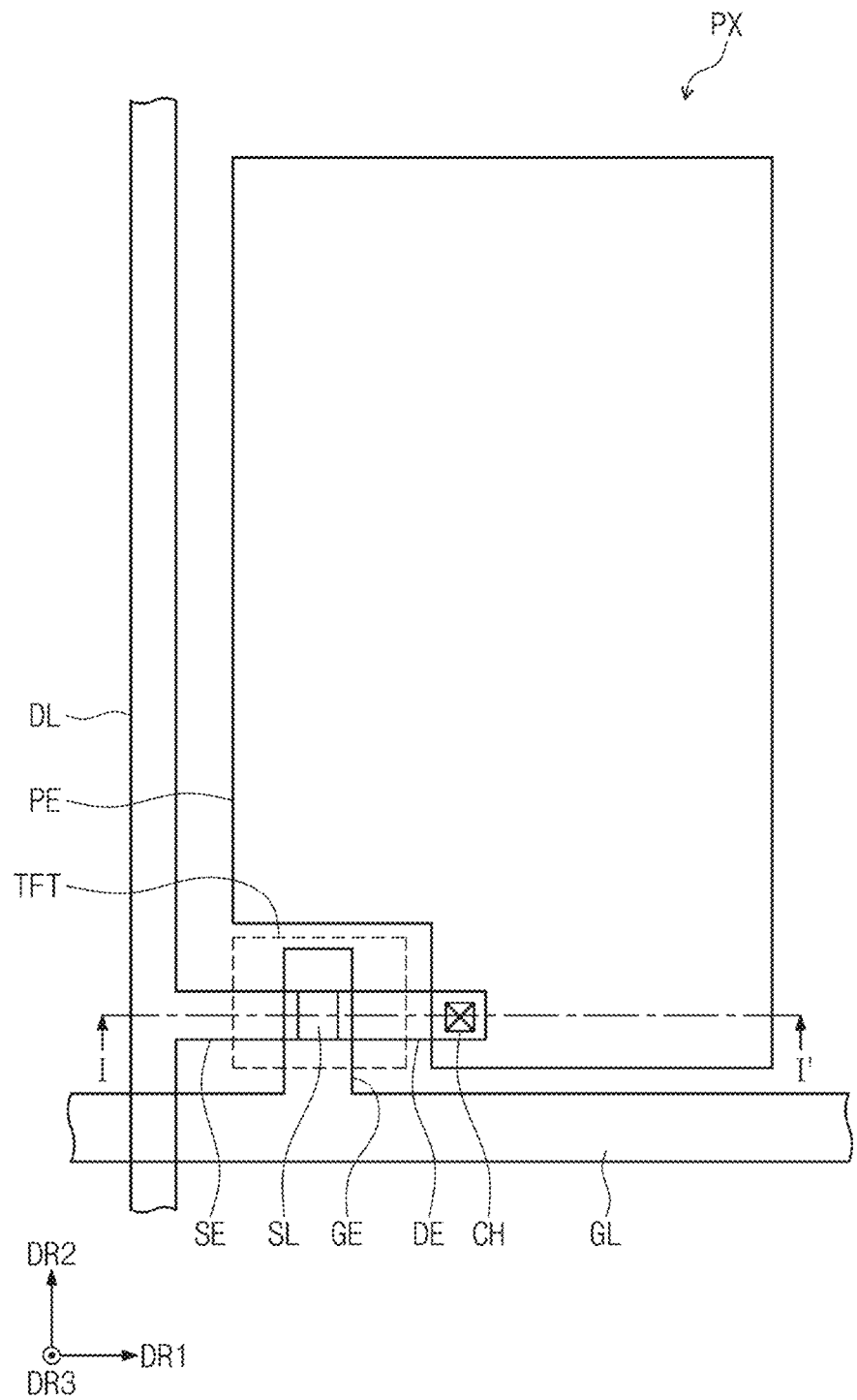
FIG. 2A is a plan view illustrating a pixel according to an embodiment.
Figure 2B:
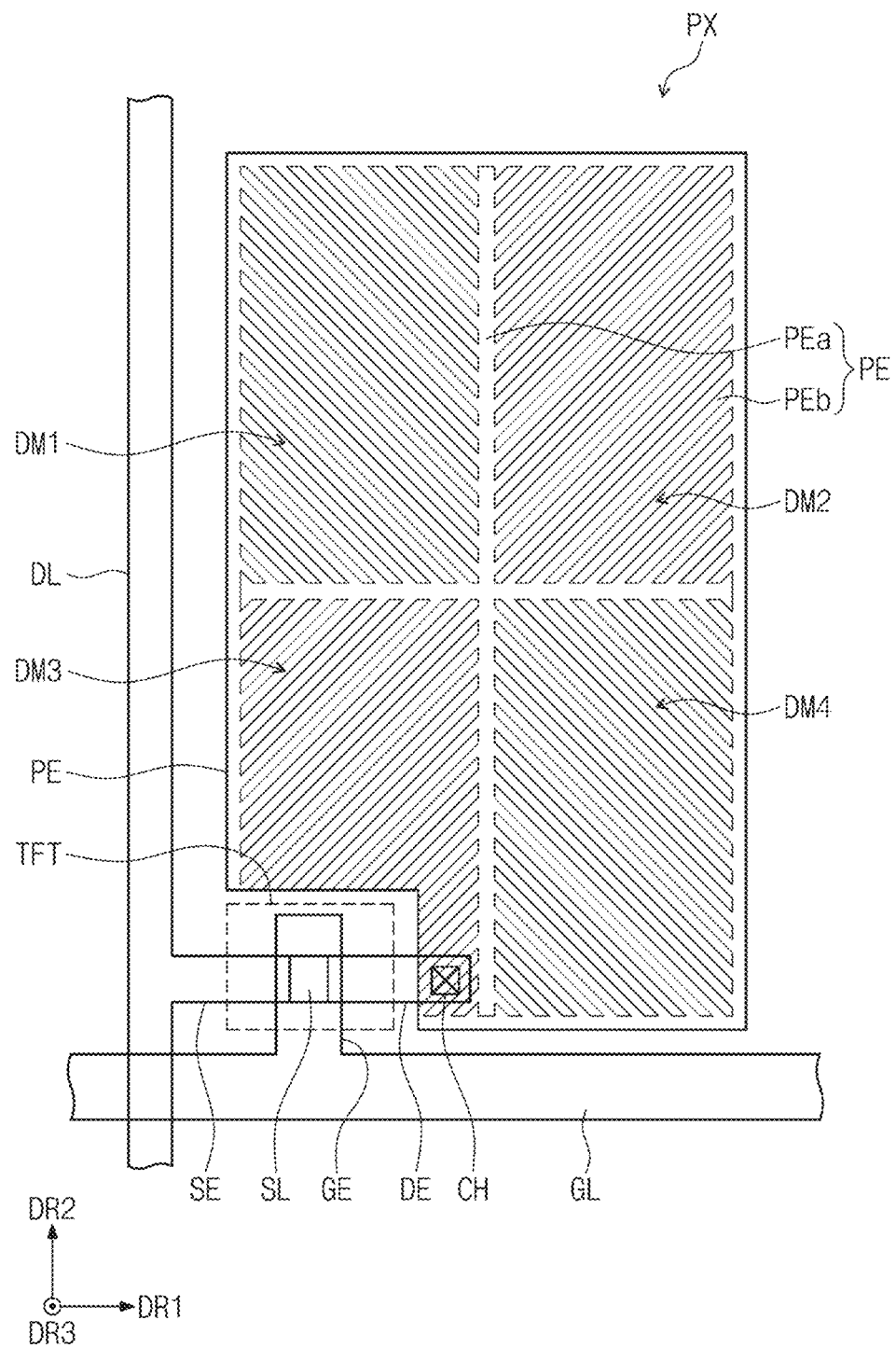
FIG. 2B is a plan view illustrating a pixel according to an embodiment.
Figure 3:
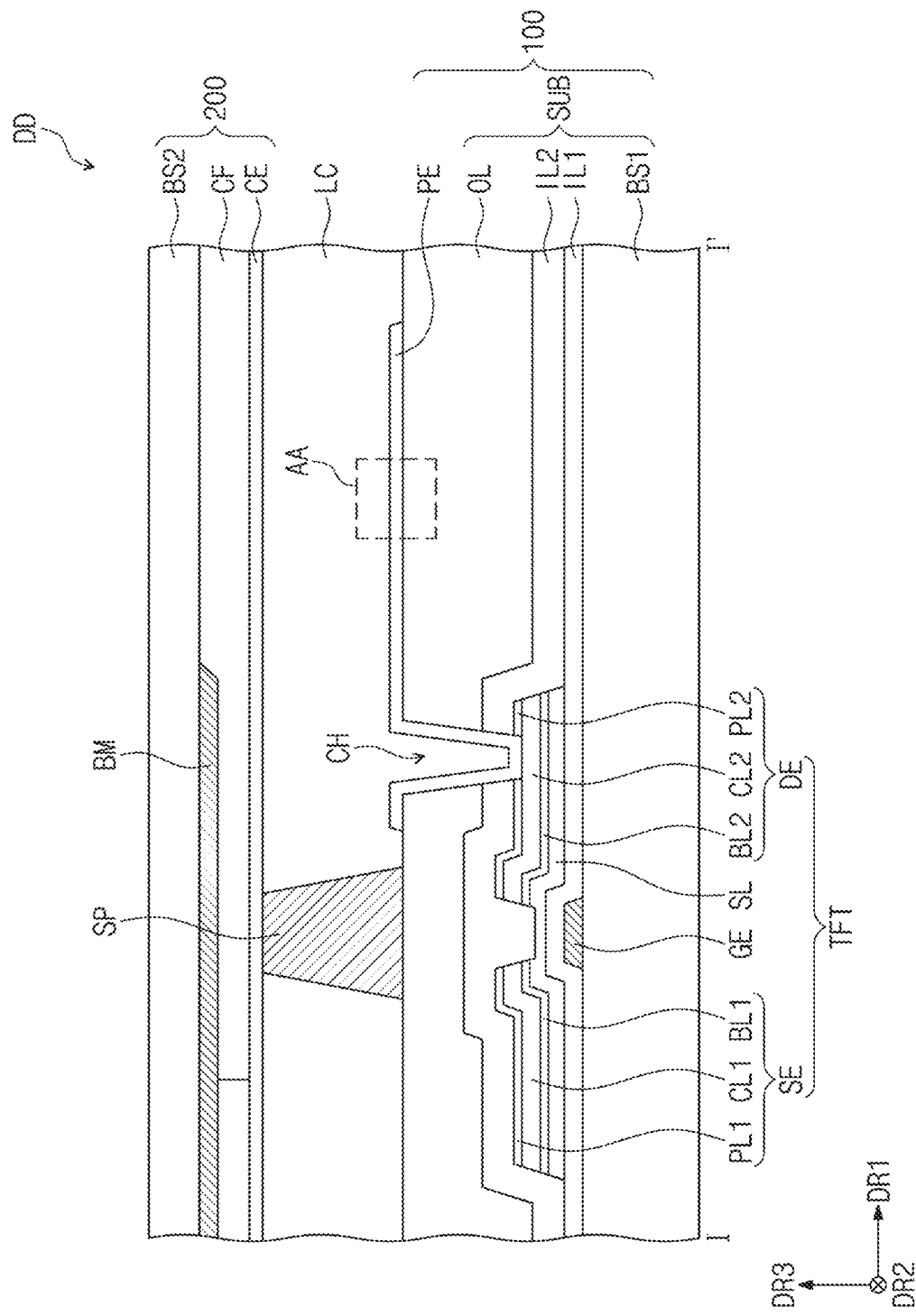
FIG. 3 is a cross-sectional view illustrating a portion of a display device according to an embodiment.

FIG. 1 is a perspective view of a display device according to an embodiment. FIGS. 2A and 2B are each a plan view illustrating a pixel according to an embodiment. FIG. 3 is a cross-sectional view of a portion of a display device according to an embodiment. FIG. 3 is a cross-sectional view of a display device according to an embodiment, taken along line I-I' illustrated in FIG. 2.

Referring to FIG. 1, a display device DD according to an embodiment may include a transistor substrate 100 having pixels PX that display an image, an opposite substrate 200, and a display element layer LC disposed between the transistor substrate 100 and the opposite substrate 200. In FIG. 1, the display device DD according to an embodiment may be provided as various types of display devices according to the type of the display element layer LC. For example, according to the type of the display element layer, the display device may be provided in the form of, for example, an organic light emitting display device, an electrophoretic display device, a quantum dot light emitting display device, a plasma display device, a microelectromechanical system (MEMS) display device, or an electrowetting display device. Hereinafter, a liquid crystal display device will be described as an example of the display device according to an embodiment.

In an embodiment, the transistor substrate 100 may be divided into a display region DA having pixels PX formed therein, and a non-display region NDA excluding the display region DA. The display region DA may be a region in which an image is displayed. The non-display region NDA may be a region in which an image is not displayed.

The non-display region NDA may be disposed adjacent to the display region DA. The non-display region NDA may be disposed to surround the display region DA. The display region DA may have a quadrilateral shape on a plane. However, this is merely an example and embodiments to the shape of the display region DA are not limited thereto. The shape of each of the display region DA and the non-display region NDA, and an arrangement relationship therebetween may be relatively designed.

In an embodiment, the opposite substrate 200 may be disposed on the transistor substrate 100. A voltage may be applied to the opposite substrate 200 from the outside. However, this is merely an example and embodiments regarding the voltage source are not limited thereto. For example, voltages different from each other may be applied to the transistor substrate 100 from the outside, and a separate voltage may not be applied to the opposite substrate 200 in another embodiment.

In an embodiment, the display element layer LC may be a layer that emits light. For example, the display element layer LC may be a liquid crystal layer. Specifically, the display element layer LC may include a plurality of liquid crystal molecules having a dielectric anisotropy. When an electric field is applied between the transistor substrate 100 and the opposite substrate 200, the liquid crystal molecules may rotate in a certain direction between the transistor substrate 100 and the opposite substrate 200. Accordingly, the display element layer LC may adjust the transmittance of light incident on the display element layer LC.

The display element layer LC may further include a spacer SP. The spacer SP may adjust a gap between the transistor substrate 100 and the opposite substrate 200.

Referring to FIGS. 1 to 3, the transistor substrate 100 may include a base substrate BS1, a transistor TFT, and an organic layer OL. The base substrate BS1 may include a plastic substrate, a glass substrate, a metal substrate, an organic/inorganic composite material substrate or the like. The base substrate BS1 may support the transistor TFT.

The transistor TFT may include a control electrode GE, an input electrode SE and an output electrode DE. The organic layer OL may be disposed on the transistor TFT. The organic layer OL may planarize an upper surface of the transistor substrate 100.

The pixel PX may include the transistor TFT and a pixel electrode PE connected to the transistor TFT. In an embodiment, the pixel PX may be connected to each of a gate line GL and a data line DL.

The gate line GL may extend in a first direction DR1. The data line DL may extend in a second direction DR2 perpendicular to the first direction DR1. FIG. 2 illustrates that the display device DD according to an embodiment includes a single data line DL and a single gate line GL. However, this is merely an example and embodiment regarding the numbers of the data lines DL and the gate lines GL are not limited thereto. For example, the display device according to another embodiment may include a plurality of gate lines GL and a plurality of data lines DL.

The transistor TFT may include a control electrode GE, an input electrode SE, an output electrode DE and a semiconductor layer SL. The control electrode GE may be branched from the gate line GL. Specifically, the control electrode GE may protrude from the gate line GL in the second direction DR2. The control electrode GE and the gate line GL may include the same material.

The control electrode GE may include at least one of an aluminum (Al)-based metal, a silver (Ag)-based metal, a copper (Cu)-based metal, a molybdenum (Mb)-based metal, chromium (Cr), titanium (Ti), tantalum (Ta) or manganese (Mn). In the present disclosure, the wording "— based metal" is defined as a concept including a pure—metal, and an alloy including the—metal.

The transistor substrate 100 may further include a first insulation film IL1 disposed on the control electrode GE. The first insulation film IL1 may include an insulation material such as silicon oxide (SiOx) or silicon nitride (SiNx).

The first insulation film IL1 may insulate the input electrode SE and the output electrode DE from the control electrode GE. Although not illustrated in FIGS. 2 and 3, a plurality of gate lines and a plurality of data lines may cross each other in a state where the gate lines and the data lines are insulated from each other with the first insulation film IL1 therebetween.

The semiconductor layer SL may be disposed on the first insulation film IL1. The semiconductor layer SL may at least partially overlap the control electrode GE in a plan view. The semiconductor layer SL may include an oxide semiconductor. For example, the oxide semiconductor may include an oxide including at least one of zinc (Zn), indium (In), tin (Sn) or gallium (Ga). Specifically, the semiconductor layer SL may be made of an indium gallium zinc oxide ("IGZO"). However, this is merely an example and embodiments regarding materials in the oxide semiconductor are not limited thereto. The oxide semiconductor may include an oxide of a combination of various metals in another embodiment.

The input electrode SE may be branched from the data line DL. Specifically, the input electrode SE may protrude from the data line DL in the first direction DR1. The input electrode SE and the data line DL may include the same material.

The output electrode DE may be disposed apart from the input electrode SE. When seen on a plane, the input electrode SE and the output electrode DE may at least partially overlap the semiconductor layer SL in a plan view.

The input electrode SE may receive a data voltage from the data line DL. The output electrode DE may receive the data voltage delivered through the semiconductor layer SL. The input electrode SE and the output electrode DE may each include the same material as the data line DL.

The input electrode SE and the output electrode DE may be disposed on the semiconductor layer SL and expose a portion of the semiconductor layer SL. The portion, exposed by the input electrode SE and the output electrode DE, of the semiconductor layer SL may be a portion in which a channel region of the transistor TFT is formed. The channel region may be a path along which electric charges are transferred. The data voltage received through the input electrode SE may be delivered to the output electrode DE through the channel region.

The input electrode SE may include a first barrier layer BL1, a first wiring layer CL1 and a first protective layer PL1 which are stacked in sequence. In addition, the output electrode DE may include a second barrier layer BL2, a second wiring layer CL2 and a second protective layer PL2 which are stacked in sequence. That is, the input electrode SE and the output electrode DE may each have a three-film structure.

The first wiring layer CL1 and the second wiring layer CL2 may be made of the same material. The first wiring layer CL1 and the second wiring layer CL2 may have the same layer structure. Specifically, the first wiring layer CL1 and the second wiring layer CL2 may include at least one metal. For example, the first wiring layer CL1 and the second wiring layer CL2 may include copper (Cu) or a copper alloy.

The first barrier layer BL1 may be disposed between the first wiring layer CL1 and the semiconductor layer SL. The second barrier layer BL2 may be disposed between the second wiring layer CL2 and the semiconductor layer SL. The first barrier layer BL1 and the second barrier layer BL2 prevent a material such as metal, which constitutes the first wiring layer CL1 and the second wiring layer CL2, from diffusing into the semiconductor layer SL. The first barrier layer BL1 and the second barrier layer BL2 may each include at least one of vanadium (V), zirconium (Zr), tantalum (Ta), manganese (Mn), magnesium (Mg), chromium (Cr), molybdenum (Mo), cobalt (Co), neodymium (Nb) or nickel (Ni). In addition, the first barrier layer BL1 and the second barrier layer BL2 may each include at least one metal oxide among an indium zinc oxide (IZO), a gallium zinc oxide (GZO) and an aluminum zinc oxide ("AZO").

The first protective layer PL1 may be disposed on the first wiring layer CL1 to cover an upper surface of the first wiring layer CL1. The second protective layer PL2 may be disposed on the second wiring layer CL2 to cover an upper surface of the second wiring layer CL2. The first protective layer PL1 and the second protective layer PL2 may prevent the first wiring layer CL1 and the second wiring layer CL2 from coming into contact with air, thereby preventing oxidation of the first wiring layer CL1 and the second wiring layer CL2. Accordingly, the transistor TFT may be prevented from property degradation caused by modification of the first wiring layer CL1 and the second wiring layer CL2.

The first protective layer PL1 and the second protective layer PL2 may each be made of a metal oxide. In an embodiment, the first protective layer PL1 and the second protective layer PL2 may each include at least one of an indium oxide (InO) or a zinc oxide (ZnO).

The transistor substrate 100 according to an embodiment may further include a second insulation film IL2 disposed on the first insulation film IL1 and the input electrode SE. The second insulation film IL2 may be made of an insulation material such as silicon oxide (SiOx) or silicon nitride (SiNx). The second insulation film IL2 may insulate the input electrode SE and the output electrode DE from other components.

Referring to FIG. 2A, the pixel electrode PE may be disposed on the organic layer OL. The pixel electrode PE may be disposed between the organic layer OL and the display element layer LC. The pixel electrode PE may be provided in an integrated shape. A contact hole CH by which an upper surface of the output electrode DE is partially exposed may be defined in the organic layer OL. The pixel electrode PE may be electrically connected to the transistor TFT through the contact hole CH. The pixel electrode PE may receive the data voltage through the second wiring layer CL2 constituting the output electrode DE.

FIG. 2B is different from FIG. 2A only in that the pixel electrode PE is divided into a plurality of domains DM1, DM2, DM3 and DM4. In FIG. 2B, the pixel electrode PE includes a stem part PEa, and a plurality of branch parts PEb which protrude radially and extend from the stem part PEa. The stem part PEa or some of the branch parts PEb are connected to the output electrode DE through the contact hole CH.

The stem part PEa may be provided in various shapes, for example, a cross shape as in an embodiment of the invention. The branch parts PEb are spaced apart not to contact each other, and extend in parallel with each other in a region divided by the stem part PEa. The branch parts PEb adjacent to each other are spaced apart by a distance in micrometer units, and correspond to a mechanism for aligning liquid crystal molecules of a liquid crystal layer LC at a particular orientation angle.

Each of the pixels PX may be divided into the plurality of domains DM1, DM2, DM3 and DM4 by the stem part PEa. The branch parts PEb may correspond to the domains DM1, DM2, DM3 and DM4, respectively, and extend in different directions from each other in the respective domains DM1, DM2, DM3 and DM4. In an embodiment of the invention, it is exemplarily illustrated that each of the pixels PX includes four domains. However, embodiments of the invention are not limited thereto, and each of the pixels PX may include various numbers of domains, for example, 2, 6 or 8 domains in another embodiment. In addition, a divided form of the domains is not limited to the illustration in FIG. 2B. The stem part PEa may be arranged parallel with a first direction axis DR1, or arranged parallel with a second direction axis DR2, to make a division into a plurality of domains.

The opposite substrate 200 may include a base layer BS2, a color filter CF, a light-shielding part BM and a common electrode CE. The base layer BS2 may include a plastic substrate, a glass substrate, a metal substrate, an organic/inorganic composite material substrate or the like. The base layer BS2 may support the color filter CF and the light-shielding part BM.

The common electrode CE may be disposed on the display element layer LC. The common electrode CE may form an electric field with the pixel electrode PE. The common electrode CE and the pixel electrode PE may form the electric field to control the display element layer LC. For example, when the display element layer LC is a liquid crystal layer, the electric field formed by the common electrode CE and the pixel electrode PE may control an orientation of the liquid crystal layer.

The color filter CF may transmit light having a certain wavelength. For example, the color filter CF may include a blue filter that transmits blue light, a green filter that transmits green light, or a red filter that transmits red light. Specifically, the blue filter may include a blue pigment or dye, the green filter may include a green pigment or dye, and the red filter may include a red pigment or dye. However, embodiments regarding the color filter CF are not limited thereto, and the color filter CF may not include a pigment or dye in another embodiment. The color filter CF may include a photosensitive polymer resin and not include a pigment or dye. The color filter CF may be transparent. The color filter CF may be formed of a transparent photosensitive resin.

The light-shielding part BM may be a black matrix. The light-shielding part BM may be formed of an organic light-shielding material or inorganic light-shielding material containing a black pigment or a black dye. The light-shielding part BM may prevent light leakage and demarcate adjacent color filters CF.

In the display device DD according to an embodiment illustrated in FIG. 3, the common electrode CE, the color filter CF and the light-shielding part BM are provided on the opposite substrate 200. However, embodiments of the invention are not limited thereto. In another embodiment, for example, the common electrode CE may be provided on the transistor substrate 100. Here, the common electrode CE may be disposed between the pixel electrode PE and the display element layer LC.

Figure 4:
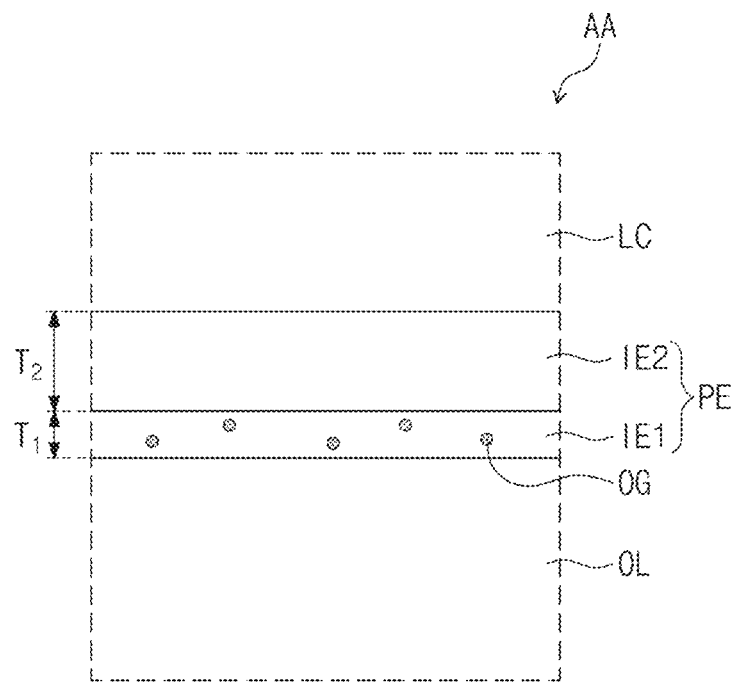
FIG. 4 is an enlarged cross-sectional view of a portion of a display device according to an embodiment.

FIG. 4 is an enlarged cross-sectional view of a portion of a display device according to an embodiment. FIG. 4 is an enlarged cross-sectional view of a portion AA illustrated in FIG. 3.

Referring to FIG. 4, the pixel electrode PE according to an embodiment may include a first electrode layer IE1 and a second electrode layer IE2. The first electrode layer IE1 may be disposed on the organic layer OL. The second electrode layer IE2 may be disposed on the first electrode layer TEL The first electrode layer IE1 may be disposed more adjacent to the organic layer OL than the second electrode layer IE2 is. The second electrode layer IE2 may be disposed more adjacent to the display element layer LC than the first electrode layer IE1 is. The first electrode layer IE1 may be disposed directly on the organic layer OL. The second electrode layer IE2 may be disposed directly on the first electrode layer IE1.

The first electrode layer IE1 and the second electrode layer IE2 may each include a metal oxide. The first electrode layer IE1 and the second electrode layer IE2 may include the same metal oxide or include different metal oxides. For example, the first electrode layer IE1 and the second electrode layer IE2 may each independently include at least one of an indium zinc oxide (IZO) or an indium titanium oxide (ITO).

The first electrode layer IE1 may contain an organic matter OG derived from the organic layer OL. The second electrode layer IE2 may not contain the organic matter OG derived from the organic layer OL. The thickness $T_1$ of the first electrode layer IE1 may be smaller than the thickness $T_2$ of the second electrode layer IE2. In the present disclosure, the wording "not containing an organic matter OG" means that the organic matter OG is not detected or that an amount of the detected organic matter OG is negligible.

When an electrode including a metal oxide contains an organic matter as an impurity, the risk of damage to the electrode increases. Thus, in the electrode including the metal oxide, as the proportion of a part containing the organic matter gets smaller, the risk of damage to the electrode may become lower. In an embodiment, the thickness $T_1$ of the first electrode layer IE1 containing the organic matter OG may be smaller than the thickness $T_2$ of the second electrode layer IE2 not containing the organic matter OG, thereby reducing the risk of damage to the pixel electrode PE.

The first electrode layer IE1 and the second electrode layer IE2 may each be formed via a sputtering method. During formation of the first electrode layer IE1, the organic matter OG may be derived from the organic layer OL and contained in the first electrode layer TEL The first electrode layer IE1 may block the organic matter OG derived from the organic layer OL from being discharged to the upside. Accordingly, when the second electrode layer 1E2 is formed on the first electrode layer IE1, the organic matter OG derived from the organic layer OL may be blocked from being introduced into the second electrode layer 1E2.

The thickness $T_1$ of the first electrode layer IE1 may be about 50 micrometers (μm) to about 100 μm. The thickness $T_2$ of the second electrode layer 1E2 may be about 175 μm to about 225 μm. When the thickness $T_1$ of the first electrode layer IE1 is less than about 50 μm, the first electrode layer IE1 may not block the organic matter OG discharged from the organic layer OL, and thus the organic matter OG derived from the organic layer OL may be introduced into the second electrode layer IE2 during formation of the second electrode layer IE2 on the first electrode layer TEL When the thickness $T_1$ of the first electrode layer IE1 is greater than about 100 μm, the thickness $T_1$ of the first electrode layer IE1 containing the organic matter OG becomes larger, and thus the risk of damage to the pixel electrode PE may increase.

Since the organic matter OG is derived from the organic layer OL, the organic matter OG may include the same material as the organic layer OL. In an embodiment, the organic matter OG may include a carbon trioxide ($CO_3$). The organic matter OG may further include a carbon (C) gas. However, this is merely an example and an embodiment of the material included in the organic matter OG is not limited thereto. The organic matter OG may further include a carbon oxide that may be generated in the organic layer OL during a sputtering process in another embodiment. For example, the organic matter OG may further include a carbon dioxide.

Figure 5:
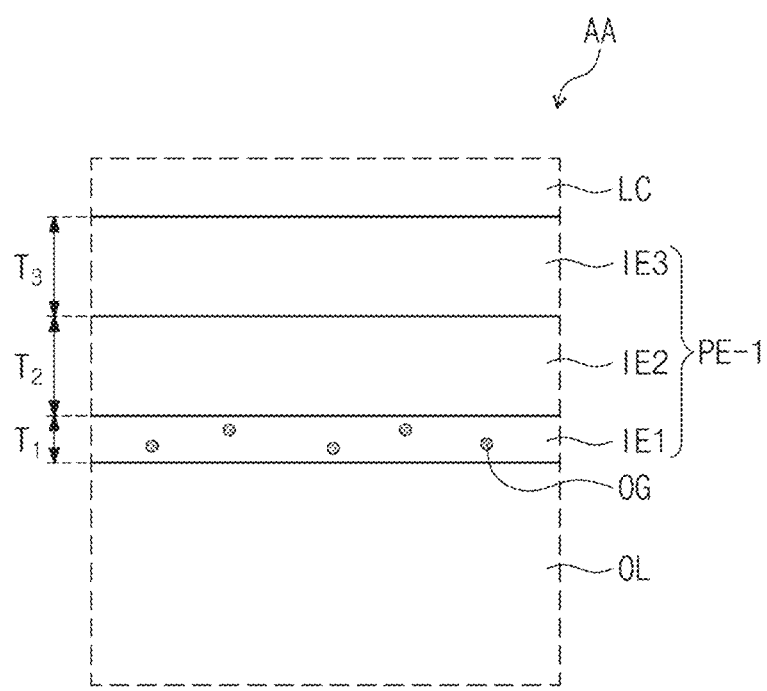
FIG. 5 is an enlarged cross-sectional view of a portion of a display device according to an embodiment.

FIG. 5 is an enlarged cross-sectional view of a portion of a display device according to an embodiment. FIG. 5 is an enlarged cross-sectional view of a portion AA illustrated in FIG. 3. In describing a pixel electrode PE-1 illustrated in FIG. 5, the same contents as the contents described above with reference to FIGS. 1 to 4 are not described, and the description below will be focused on the difference.

Referring to FIG. 5, the pixel electrode PE-1 may further include a third electrode layer IE3 disposed on a second electrode layer IE2. The third electrode layer IE3 may not contain an organic matter OG derived from the organic layer OL. The third electrode layer IE3 may include a metal oxide. The third electrode layer IE3 may include at least one of IZO or ITO. The thickness $T_3$ of the third electrode layer IE3 may be larger than the thickness $T_1$ of a first electrode layer TEL The second electrode layer 1E2 and the third electrode layer IE3 may include the same material.

Hereinafter, a display device manufacturing method according to an embodiment will be described in detail with reference to FIGS. 6 to 11. The same contents as the contents described above with reference to FIGS. 1 to 5 are not described, and the description below will be focused on features of a manufacturing method.

Figure 6:
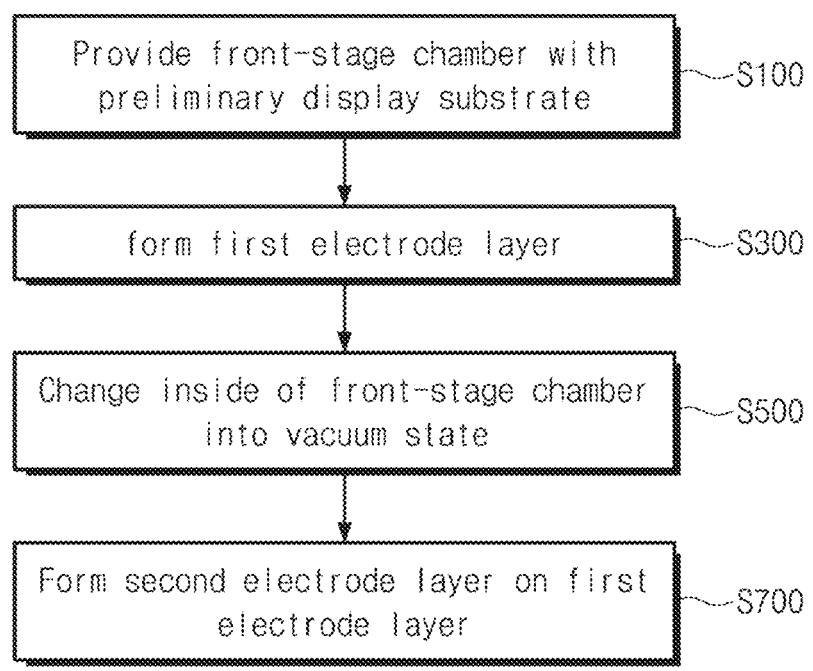
FIG. 6 is a flowchart of a display device manufacturing method according to an embodiment.
Figure 7:
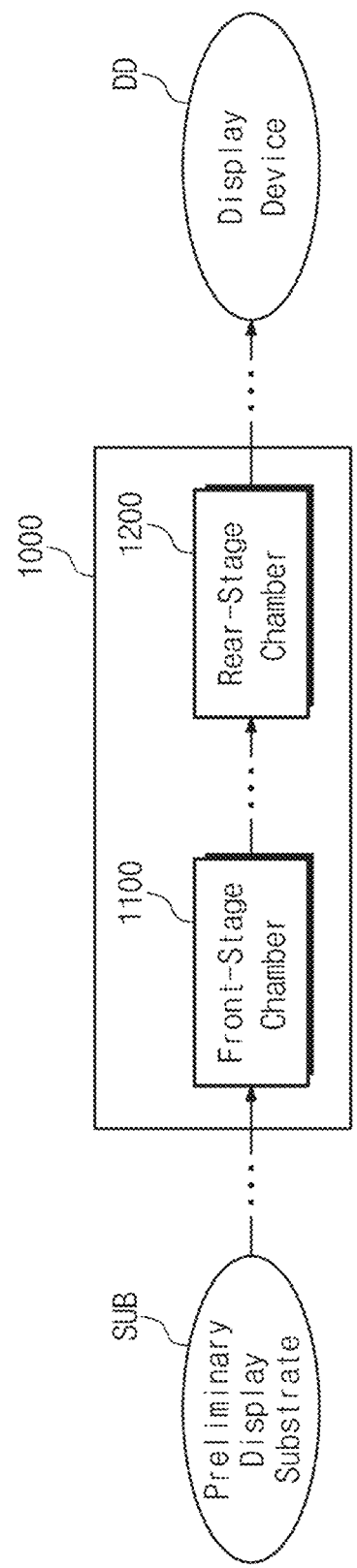
FIG. 7 is a view schematically illustrating a display device manufacturing apparatus according to an embodiment.

FIG. 6 is a flowchart of a display device manufacturing method according to an embodiment. FIG. 7 is a view schematically illustrating a display device manufacturing apparatus according to an embodiment. Each of FIGS. 8 to 11 is a view schematically illustrating an operation of a display device manufacturing method according to an embodiment.

Figure 8:
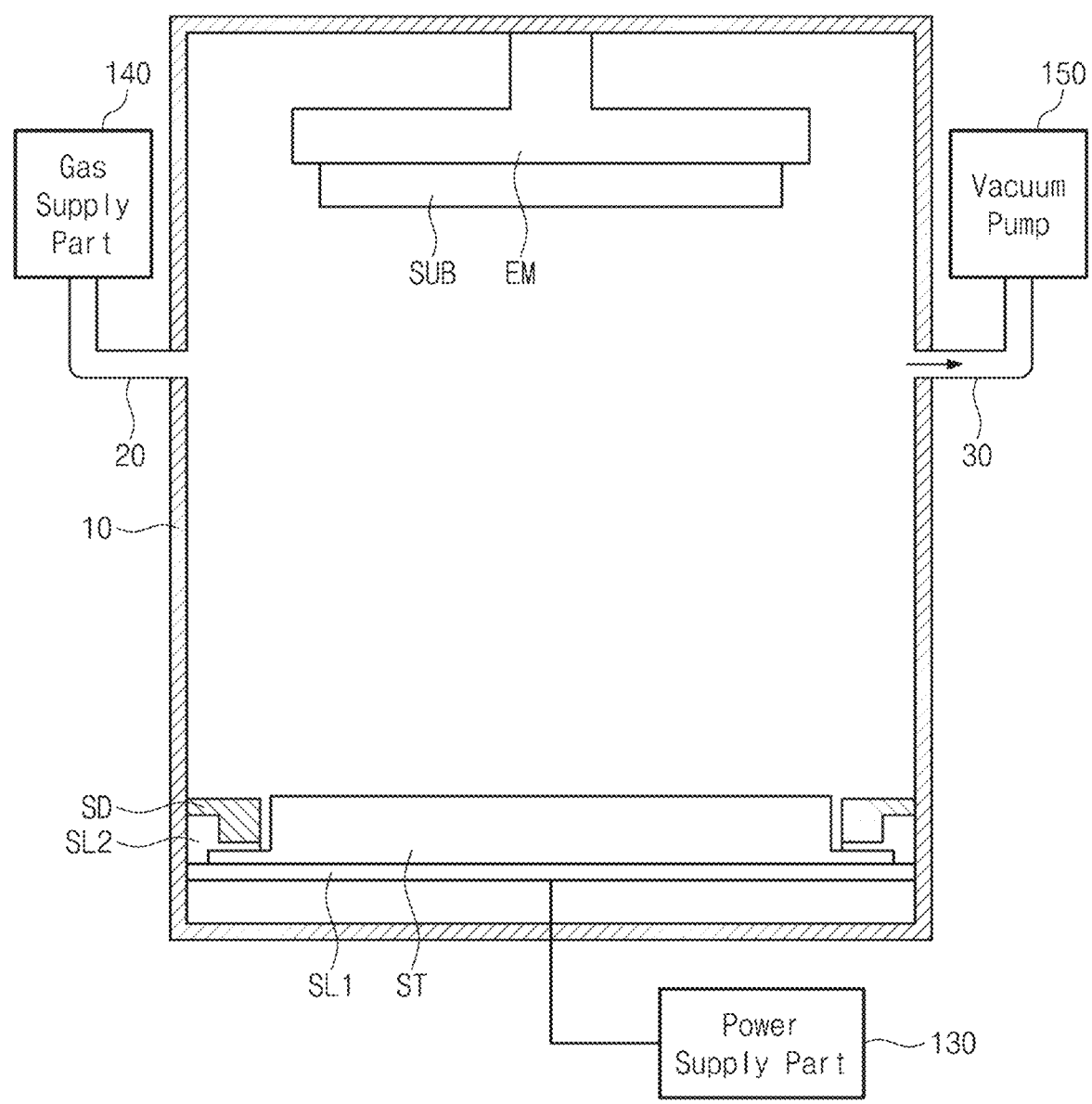
FIG. 8 is a view schematically illustrating an operation of a display device manufacturing method according to an embodiment.

Referring to FIGS. 6 to 8, a display device manufacturing method according to an embodiment may include: providing a front-stage chamber with a preliminary display substrate (S100), forming a first electrode layer (S300), changing the inside of the front-stage chamber into a vacuum state (S500), and forming a second electrode layer on the first electrode layer (S700). The display device manufacturing method according to an embodiment may use a display device manufacturing apparatus 1000 according to an embodiment. The display device manufacturing apparatus 1000 according to an embodiment may include a front-stage chamber 1100 and a rear-stage chamber 1200. FIG. 7 illustrates that the display device manufacturing apparatus 1000 includes two chambers. However, this is merely an example and embodiments for the display device manufacturing apparatus 1000 are not limited thereto. For example, the display device manufacturing apparatus 1000 may include three or more chambers in another embodiment.

In the display device manufacturing apparatus 1000, the front-stage chamber 1100 and the rear-stage chamber 1200 may each include a vacuum chamber 10, a substrate part EM, a target part SL1 and SL2, a power supply part 130, a gas supply part 140 and a vacuum pump 150. A preliminary display substrate SUB may be disposed on the substrate part EM, and a sputtering target ST may be disposed on the target part SL1 and SL2.

Referring to FIG. 8, the display device manufacturing method according to an embodiment may include: providing the front-stage chamber with the preliminary display substrate SUB that includes the base substrate BS1 (see FIG. 3), the transistor TFT (see FIG. 3) disposed on the base substrate BS1 (see FIG. 3), and the organic layer OL (see FIG. 3) disposed on the transistor TFT (see FIG. 3) (S100). For example, the display device manufacturing method may include providing the preliminary display substrate SUB on the substrate part EM included in the front-stage chamber 1100.

Figure 9:
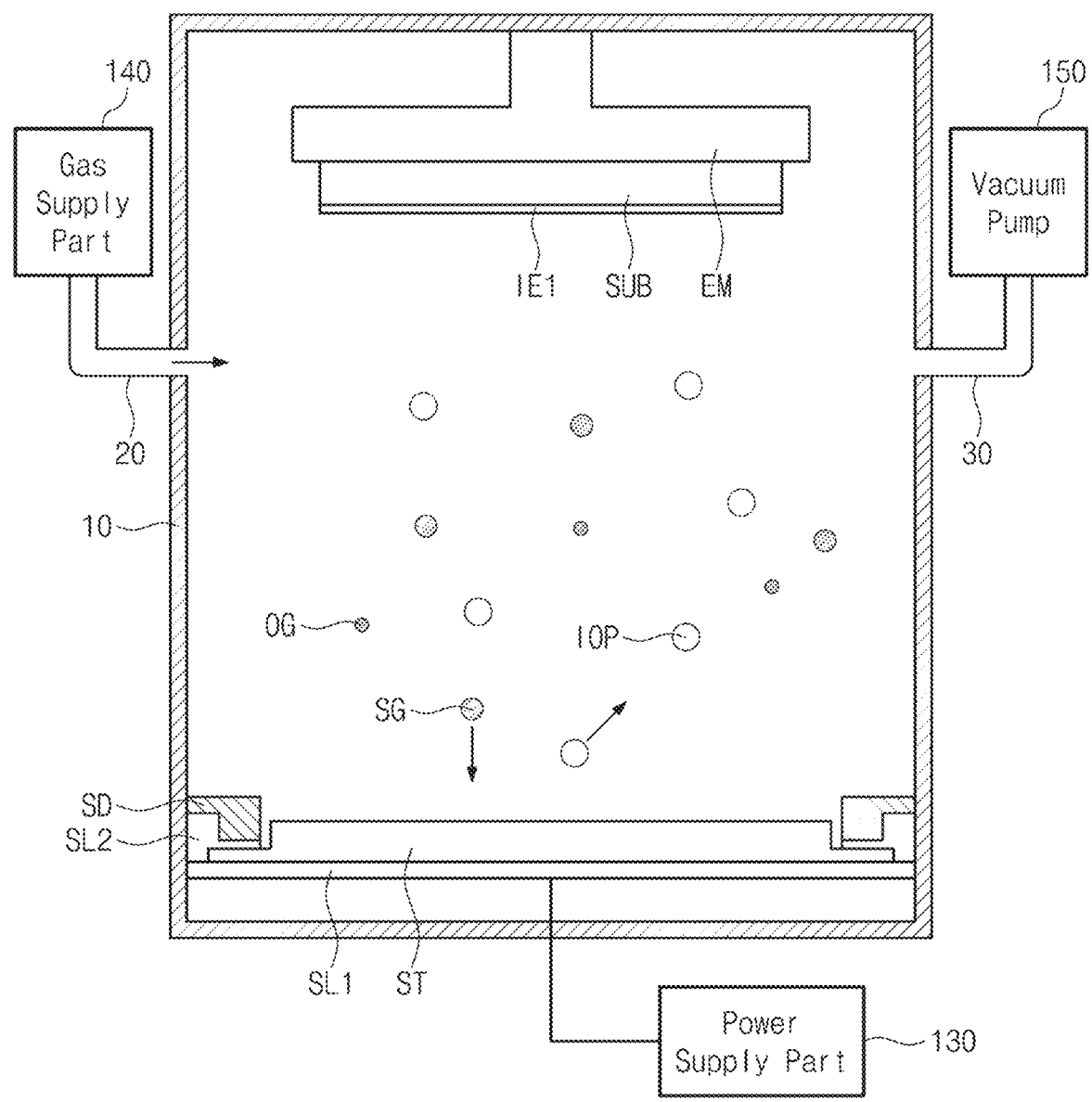
FIG. 9 is a view schematically illustrating an operation of a display device manufacturing method according to an embodiment.

Referring to FIG. 9, the display device manufacturing method according to an embodiment may include: forming a first electrode layer IE1 on the organic layer OL (see FIG. 3) in the front-stage chamber (S300). The forming of the first electrode layer IE1 on the organic layer OL (see FIG. 3) (S300) may include: supplying, by a gas supply part 140, a rare gas SG to the inside of a vacuum chamber 10 through a gas supply tube 20; supplying, by a power supply part 130, a negative (−) power to a sputtering target ST; emitting target particles TOP by colliding the rare gas SG with the sputtering target ST; and depositing the target particles TOP on the preliminary display substrate SUB. The supplying of, by the power supply part 130, the negative (−) power to the sputtering target ST may include creating plasma within the chamber.

The rare gas SG may include argon (Ar), krypton (Kr), helium (He) or xenon (Xe). The target particles TOP may be attached on the preliminary display substrate SUB to form the first electrode layer TEL The target particles TOP may include a metal oxide. For example, the target particles TOP may include at least one of an indium zinc oxide (IZO) or an indium titanium oxide (ITO).

The forming of the first electrode layer IE1 on the organic layer OL (see FIG. 3) (S300) may include: introducing the organic matter OG discharged from the organic layer OL (see FIG. 3) into the first electrode layer TEL Some of the rare gas SG may collide with the organic layer OL (see FIG. 3) of the preliminary display substrate SUB to eject the organic matter OG from the organic layer OL (see FIG. 3). The ejected organic matter OG may be partially attached to the preliminary display substrate SUB and then introduced into the first electrode layer TEL That is, the formed first electrode layer IE1 may include the target particles TOP and the organic matter OG. For example, the organic matter OG may include a carbon trioxide. The organic matter OG may further include a carbon gas.

In addition, in the chamber, byproducts including the organic matter OG and the target particle TOP may be deposited on a shield SD section. When the byproducts include the organic matter OG, the byproducts may be detached from the shield SD section and fall on the preliminary display substrate SUB to cause a scratch on the preliminary display substrate SUB. The amount of the byproduct detached from the shield SD section may increase according to the amount of the organic matter OG included in the byproducts, resulting in more scratches occurring on the preliminary display substrate SUB. The display device manufacturing method according to an embodiment may minimize the amount of the organic matter OG included in the byproducts, thereby reducing scratches occurring on the preliminary display substrate SUB.

Figure 10:
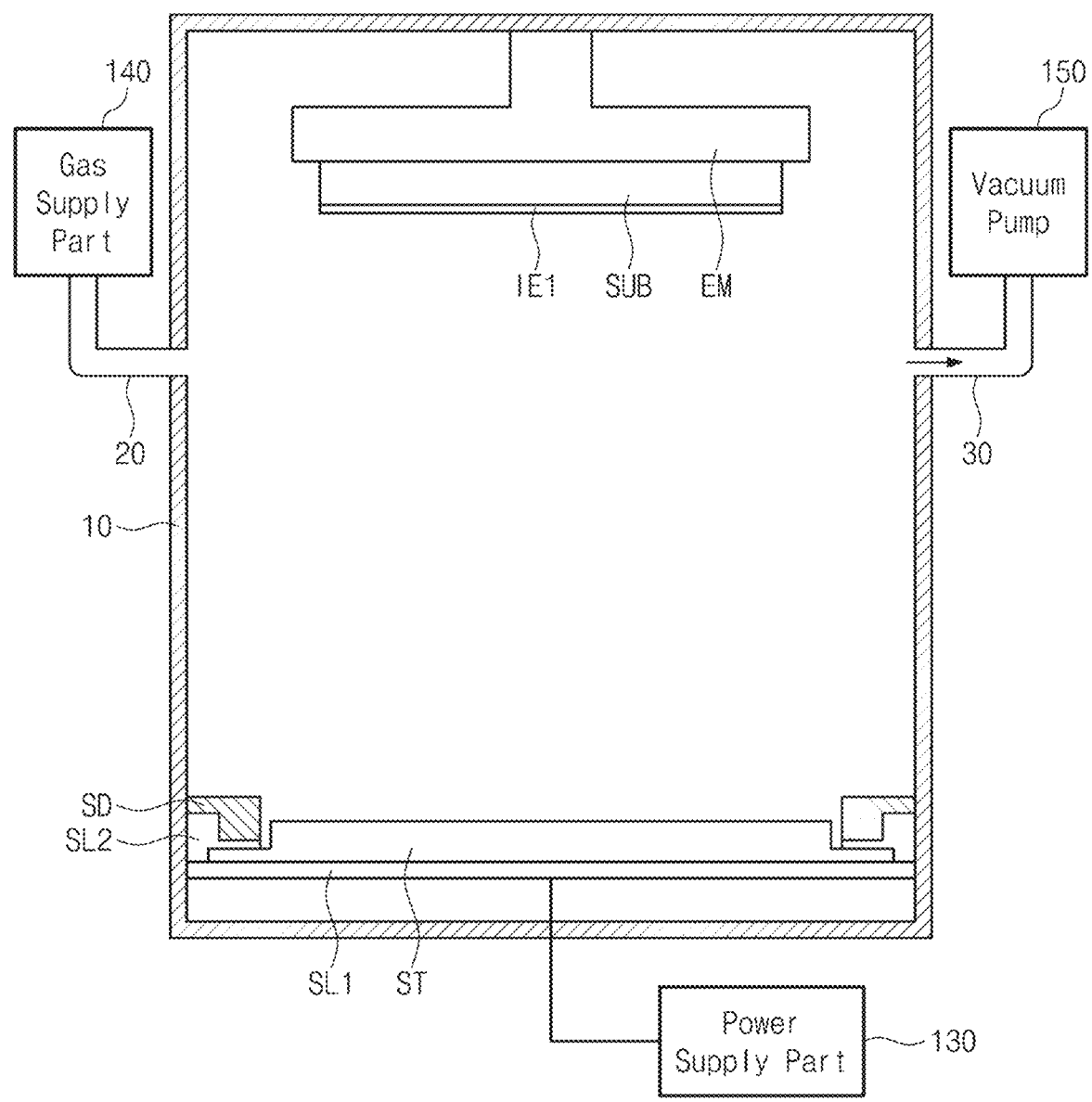
FIG. 10 is a view schematically illustrating an operation of a display device manufacturing method according to an embodiment.

Referring to FIG. 10, the display device manufacturing method according to an embodiment may include: changing the inside of a front-stage chamber into a vacuum state (S500). The changing of the inside of the front-stage chamber into a vacuum state (S500) may include: removing, by a vacuum pump 150, the organic matter OG (see FIG. 9), the target particle IOP (see FIG. 9) and the rare gas SG (see FIG. 9) in the front-stage chamber through a discharge tube 30. Since the display device manufacturing method according to an embodiment includes the changing of the inside of the front-stage chamber into a vacuum state (S500), the organic matter OG (see FIG. 9) in the front-stage chamber may be removed and thus the organic matter OG (see FIG. 9) may be prevented from being introduced into a second electrode layer IE2 (see FIG. 11) during formation of the second electrode layer IE2 (see FIG. 11) in a subsequent operation.

Figure 11:
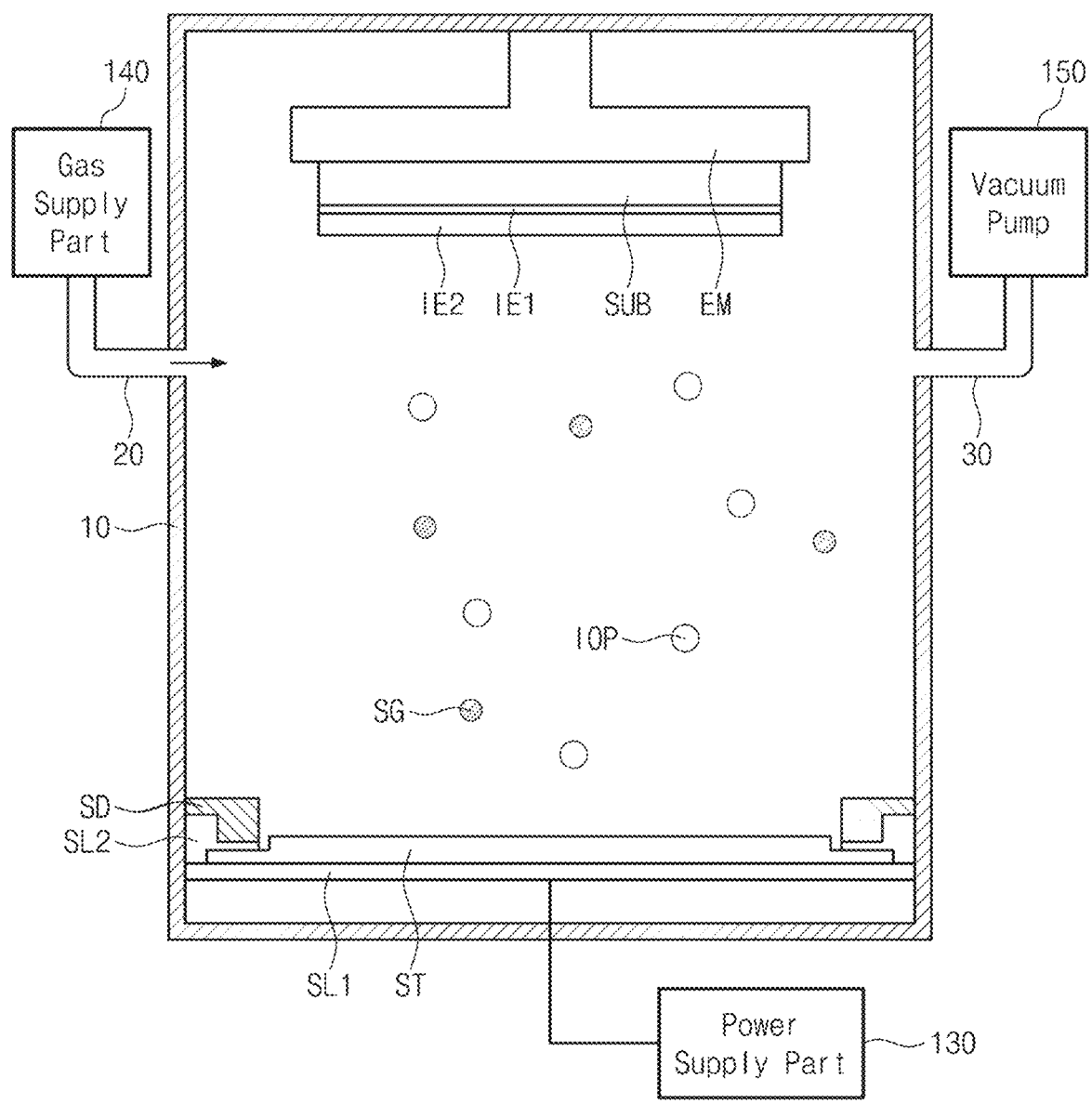
FIG. 11 is a view schematically illustrating an operation of a display device manufacturing method according to an embodiment.

Referring to FIG. 11, the display device manufacturing method according to an embodiment may include forming a second electrode layer IE2 on the first electrode layer IE1 (S700). The forming of the second electrode layer IE2 on the first electrode layer IE1 (S700) may include: supplying, by the power supply part 130, a negative (−) power to a sputtering target ST; supplying, by the gas supply part 140, a rare gas SG to the inside of the vacuum chamber 10 through the gas supply tube 20; emitting target particles TOP by colliding the rare gas SG with the sputtering target ST; and depositing the target particles TOP on the first electrode layer IE1.

The rare gas SG may include argon (Ar), krypton (Kr), helium (He) or xenon (Xe). The target particles TOP may be deposited on the first electrode layer IE1 to form the second electrode layer 1E2. The target particles TOP may include a metal oxide. For example, the target particles TOP may include at least one of an indium zinc oxide (IZO) or an indium titanium oxide (ITO).

The forming of the second electrode layer 1E2 on the first electrode layer IE1 (S700) may not include introducing the organic matter OG derived from the organic layer OL (see FIG. 3) into the second electrode layer 1E2. Referring to FIG. 3 again, the first electrode layer IE1 may cover the organic layer OL to prevent the organic matter OG (see FIG. 9) from being discharged from the organic layer OL.

The forming of the first electrode layer IE1 (S300) and the forming of the second electrode layer 1E2 on the first electrode layer IE1 (S700) may each include depositing a metal oxide. A first time taken to deposit the metal oxide in the forming of the first electrode layer IE1 (S300) may be shorter than a second time taken to deposit the metal oxide in the forming of the second electrode layer 1E2 (S700). The ratio of the first time and the second time may be about 1:1.75 to about 1:4.50. The ratio of the first time and the second time may be proportional to the thickness ratio of the first electrode layer IE1 and the second electrode layer 1E2. When the ratio of the second time to the first time is greater than about 4.50, the thickness $T_1$ (see FIG. 4) of the first electrode layer IE1 becomes too small, and thus the organic matter OG (see FIG. 9) may not be prevented from being discharged from the organic layer OL in the forming of the second electrode layer IE2 (S700). When the ratio of the second time to the first time is less than about 1.75, the thickness $T_2$ (see FIG. 4) of the second electrode layer IE2 becomes too small, and thus the pixel electrode PE may not be prevented from being damaged.

Figure 12:
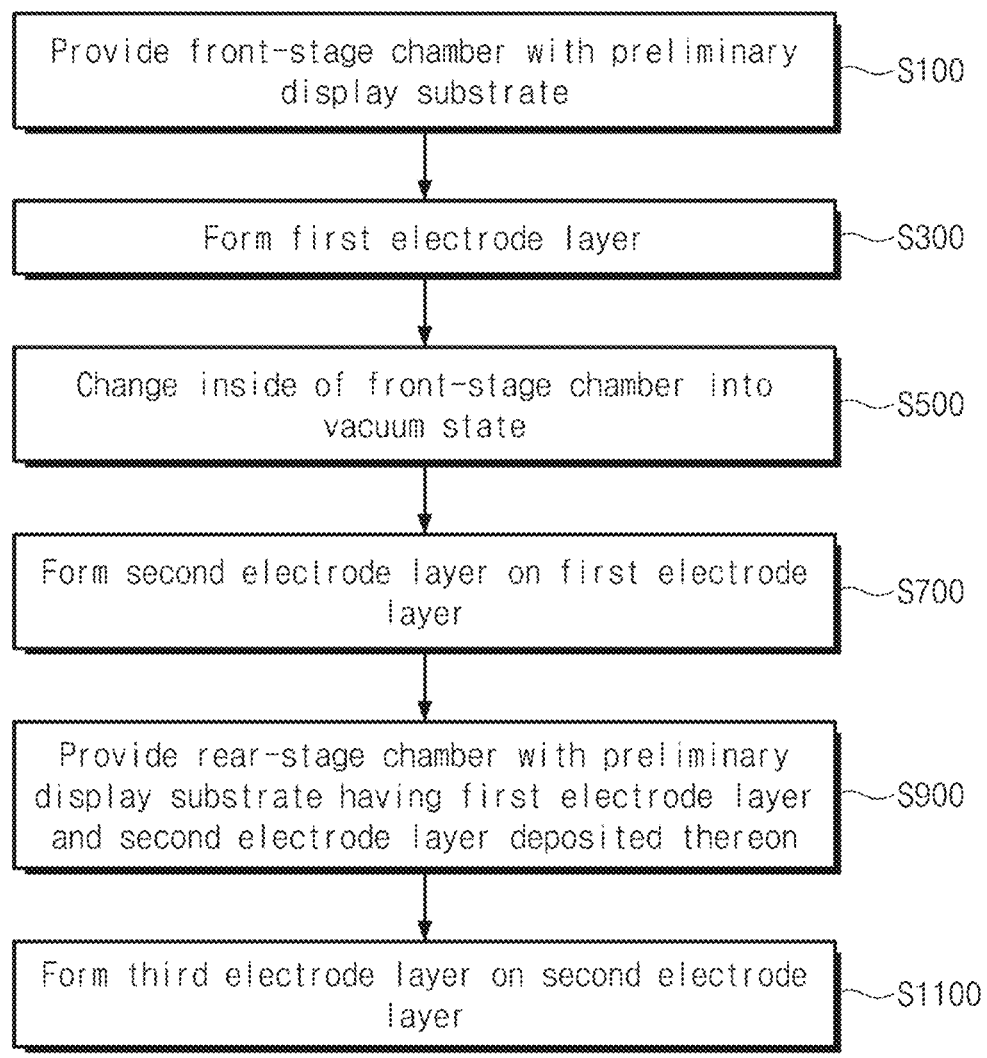
FIG. 12 is a flowchart of a display device manufacturing method according to another embodiment.

FIG. 12 is a flowchart of a display device manufacturing method according to another embodiment. The repetitive contents as the contents described above with reference to FIGS. 6 to 11 are not described again, and the description below will be focused on the difference.

Referring to FIG. 12, the display device manufacturing method according to an embodiment may further include: providing the rear-stage chamber 1200 (see FIG. 7) with the preliminary display substrate on which the first electrode layer IE1 and the second electrode layer IE2 are deposited (S900), and forming a third electrode layer IE3 on the second electrode layer IE2 (S1100). The forming of the third electrode layer IE3 on the second electrode layer IE2 may include: supplying, by a power supply part 130, a negative (−) power to a sputtering target ST; supplying, by a gas supply part 140, a rare gas SG to the inside of a vacuum chamber 10 through a gas supply tube 20; emitting target particles IOP by colliding the rare gas SG with the sputtering target ST; and depositing the target particles IOP on the second electrode layer IE2.

The rare gas SG may include argon (Ar), krypton (Kr), helium (He) or xenon (Xe). The target particles IOP may be deposited on the second electrode layer IE2 to form the third electrode layer IE3. The target particle IOP may include a metal oxide. For example, the target particles TOP may include at least one of an indium zinc oxide (IZO) or an indium titanium oxide (ITO).

The forming of the third electrode layer 1E3 on the second electrode layer 1E2 (S1100) may not include introducing the organic matter OG derived from the organic layer OL (see FIG. 3) into the third electrode layer IE3. The forming of the third electrode layer IE3 on the second electrode layer IE2 (S1100) may include forming the third electrode layer IE3 using the same material as the material of the second electrode layer IE2.

Figure 13:
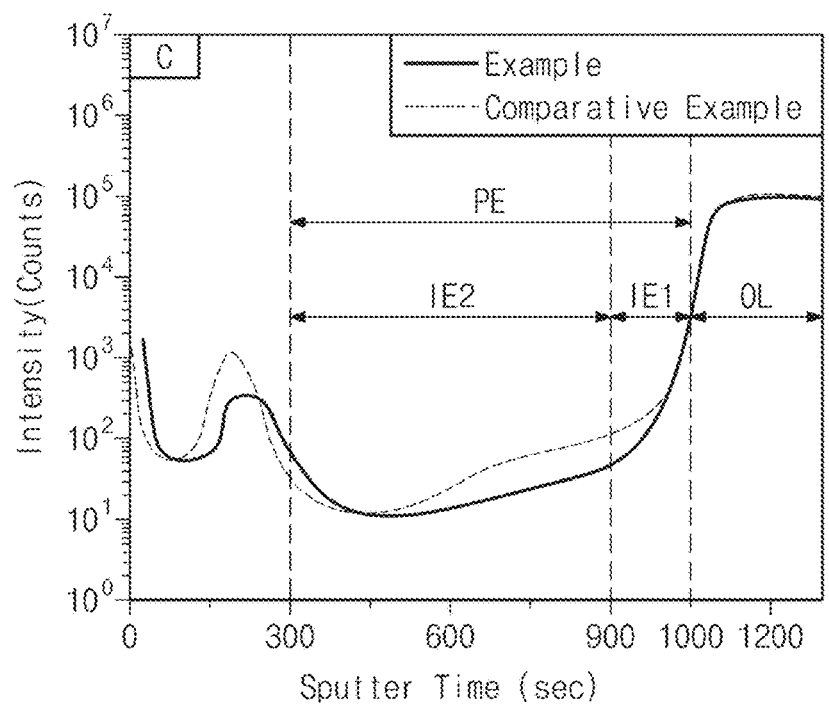
FIG. 13 is a graph of TOF-SIMS analysis on samples of display devices of Example and Comparative Example.
Figure 14:
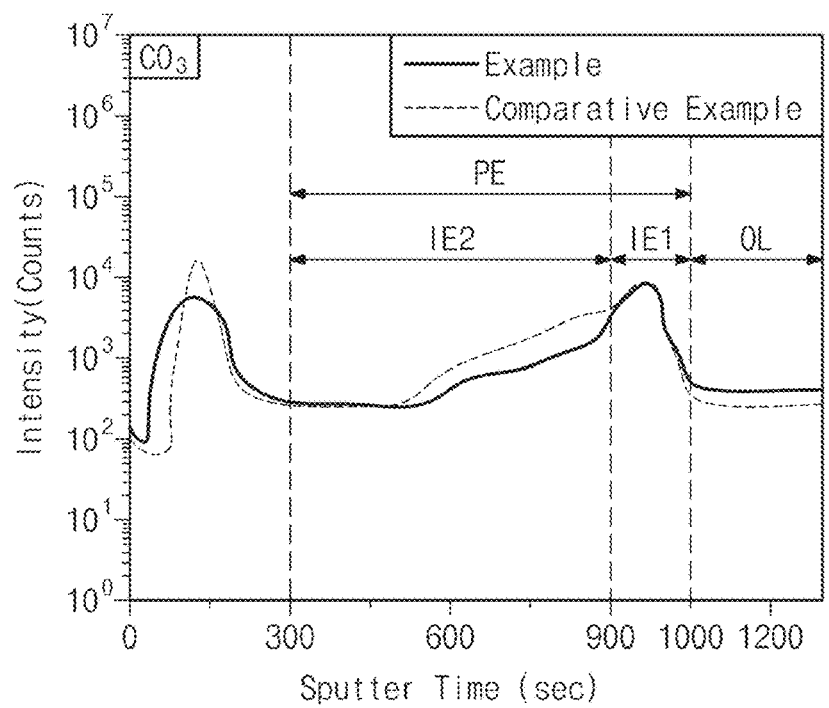
FIG. 14 is a graph of TOF-SIMS analysis on samples of display devices of Example and Comparative Example.

FIG. 13 is a graph of Time-of-Flight Secondary Ion Mass Spectrometry ("TOF-SIMS") analysis on samples of display devices of Example and Comparative Example. FIG. 14 is a graph of TOF-SIMS analysis on samples of display devices of Example and Comparative Example.

Referring to FIG. 4 again, a display device DD of Example may include an organic layer OL, a first electrode layer IE1 disposed on the organic layer OL and containing an organic matter OG, and a second electrode layer IE2 disposed on the first electrode layer IE1 and not containing the organic matter OG. A display device of Comparative Example has the same structure as the display device of Example except that the Comparative Example includes an organic layer OL and a single electrode layer disposed on the organic layer OL.

FIGS. 13 and 14 show the detection intensities of samples over sputter time. The detection intensities of samples over sputter time were measured by using TOF-SIMS. TOF-SIMS may be used to analyze a material composition of each layer of an object to be measured. As the sputter time for the object to be measured becomes longer, a sample, positioned further below, of the object to be measured is detected. FIG. 13 shows the detection intensity of a carbon (C) gas, and FIG. 14 shows the detection intensity of a carbon trioxide ($CO_3$).

Referring to FIGS. 13 and 14, the detection intensity of a sample in the second electrode layer IE2 was measured for a sputter time between about 300 seconds and about 900 seconds, the detection intensity of a sample in the first electrode layer IE1 was measured for a sputter time between about 900 seconds and about 1000 seconds, and the detection intensity of a sample in the organic layer OL was measured for a sputter time beyond about 1000 seconds.

Referring to FIG. 13, it may be confirmed that between about 450 seconds to about 900 seconds of sputter time, the display device of Example has a lower detection intensity of carbon than the display device of Comparative Example. Accordingly, it may be confirmed that in a case that the first electrode layer IE1 having a small thickness is formed and then the second electrode layer IE2 is formed, the second electrode layer IE2 contains less carbon than the first electrode layer TEL Referring to FIG. 14, it may be confirmed that between about 500 seconds to about 900 seconds of sputter time, the display device of Example has a lower detection intensity of carbon trioxide than the display device of Comparative Example. Accordingly, it may be confirmed that in a case that the first electrode layer IE1 having a small thickness is formed and then the second electrode layer IE2 is formed, the second electrode layer IE2 contains less carbon trioxide than the first electrode layer IE1.

In a display device according to an embodiment, a pixel electrode may include a first electrode layer containing an organic matter derived from an organic layer, and a second electrode layer not containing the organic matter derived from the organic layer, thereby having excellent physical strength.

A display module manufacturing method according to an embodiment may include changing the inside of a front-stage chamber into a vacuum state between forming a first electrode layer and forming a second electrode layer, thereby preventing an organic matter derived from an organic layer from being introduced into the second electrode layer. Accordingly, a pixel electrode including the first electrode layer and the second electrode layer may have excellent physical strength.

Although the embodiments of the present invention have been described, it is understood that the present invention should not be limited to these embodiments but various changes and modifications can be made by one ordinary skilled in the art within the spirit and scope of the present invention as hereinafter claimed.

Therefore, the technical scope of the invention is not limited to the contents described in the detailed description of the specification, but should be determined by the claims.

What is claimed is:

1. A display device comprising:
   a base substrate;
   a transistor disposed on the base substrate;
   an organic layer disposed on the transistor;
   a display element layer disposed on the organic layer; and
   a pixel electrode disposed between the organic layer and the display element layer,
   wherein the pixel electrode includes
      a first electrode layer disposed between the organic layer and the display element layer and containing an organic matter derived from the organic layer, and
      a second electrode layer disposed between the first electrode display element layer and not containing the organic matter,
   wherein the first electrode layer has a thickness of about 50 micrometers (μm) to about 100 μm.

2. The display device of claim 1, wherein a thickness of the first electrode layer is smaller than a thickness of the second electrode layer.

3. The display device of claim 1, wherein the first electrode layer and the second electrode layer comprise a same metal oxide.

4. The display device of claim 1, wherein the first electrode layer and the second electrode layer each independently comprise at least one of an indium zinc oxide (IZO) or an indium titanium oxide (ITO).

5. The display device of claim 1, wherein the organic matter comprises a carbon trioxide.

6. The display device of claim 5, wherein the organic matter further comprises carbon.

7. The display device of claim 1, wherein the first electrode layer is disposed directly on the organic layer.

8. The display device of claim 1, wherein the second electrode layer is disposed directly on the first electrode layer.

9. The display device of claim 1, wherein the first electrode layer and the second electrode layer are each formed via a sputtering method.

10. The display device of claim 1, wherein the pixel electrode further comprises a third electrode layer disposed on the second electrode layer and not containing the organic matter.

11. The display device of claim 10, wherein the second electrode layer and the third electrode layer comprise a same material.

\* \* \* \* \*